United States Patent [19]
Williamson

[11] Patent Number: 4,491,478
[45] Date of Patent: Jan. 1, 1985

[54] COMPOSITIONS AND METHODS FOR POLISHING METAL SURFACES

[75] Inventor: John P. H. Williamson, Farndon, England

[73] Assignee: United States Borax & Chemical Corporation, Los Angeles, Calif.

[21] Appl. No.: 521,773

[22] Filed: Aug. 9, 1983

[30] Foreign Application Priority Data

Aug. 10, 1982 [GB] United Kingdom ............... 8223013

[51] Int. Cl.$^3$ .............................................. C09G 1/02
[52] U.S. Cl. ......................................... 106/3; 51/304; 51/308
[58] Field of Search .................... 106/3; 51/304, 308; 252/99, 104, 115, 124, 128

[56] References Cited

U.S. PATENT DOCUMENTS 3,955,942  5/1976  Cordon et al. ..................... 51/295
4,240,919  12/1980  Chapman ............................ 252/95

FOREIGN PATENT DOCUMENTS 857030  8/1981  U.S.S.R.
775063  10/1981  U.S.S.R.
887497  12/1981  U.S.S.R.
908755  2/1982  U.S.S.R.

Primary Examiner—Paul Lieberman
Assistant Examiner—Amelia B. Yarbrough
Attorney, Agent, or Firm—James R. Thornton

[57] ABSTRACT

Metal polishing compositions comprising a boronated felspathoid and a suitable liquid, semi-solid or solid carrier. The boronated felspathoid has a crystal structure similar to the mineral nosean.

19 Claims, No Drawings

COMPOSITIONS AND METHODS FOR POLISHING METAL SURFACES

This invention relates to improved metal polishing compositions containing a boronated felspathoid having a crystal structure similar to the mineral nosean.

BACKGROUND OF THE INVENTION

Metal surfaces are generally polished by a combination of two processes usually carried out simultaneously. The first is an aggressive cleansing operation which involves the removal of some of the metal and produces a very scratched surface with scratches fine or coarse depending on the size of the abrasive grain. A polishing compound which provokes such an effect to a high degree is said to have a good "cut." It has been well established as for instance by Tabor, *Proc. Phys. Soc.*, London, Sect. B, 67, (1954) p. 249, and by Richarson, *Wear*, 11, (1968) p 245, that an abrasive must be significantly harder than a metal if it is to wear the metal to any extent. Those early attempts to quantify the differences required have been more recently extended by Torrance, *Wear*, 68, (1981) p 263, who, seeking to show that Moh's Scale of Hardness has a rational basis, applied a simple slip line field model to the abrasive metal contact and studied the relative shear yield stresses in the abrasive and in the metal. In another contribution Angus, *Wear*, 54, (1979) p 52, distinguished abrasive materials as "hard" or "soft" in relation to a metal using as his essential criterion the relative hardness of the abrasive ($H_a$) and the maximum work-hardened hardness of the metal ($H_m$). For a hard abrasive $H_a H_m$; for a soft abrasive $H_a H_m$. From considerations like these it is clear that while "cutting" may be an essential precursor to "polishing" the influence of the metal is such as to preclude the use of generalizations related only to the abrasive powder.

The second process is the true polishing operation. This has a function very apparent to the observer, since it has produced a good "color" on the piece, but it is more difficult to describe in theoretical terms. To some, the polished surface is so "polished" because of a plurality of ultrafine microscratches and therefore the difference between abrasion and polishing is simply a matter of degree. This approach has been well summarized by Aghan and Samuels, *Wear*, 16, (1970) p 293, on the basis of evidence derived microphotographically. Another view has been advocated for perhaps sixty years by some workers in this field who have accepted that the deformation of a material at the rubbing interface is dominated by plastic deformation properties of the materials rather than by the brittle properties. The authorities usually quoted will include G. Beilby, "Aggregation and Flow of Solids," Macmillan: London, (1921) and P. W. Bridgman, "Studies in Large Plastic Flow and Fracture," McGraw-Hill: London, (1952). To them, the polished surface is a "fluid layer" or "Beilby layer" consisting of a thin film, perhaps only a few tens of Angstroms thick, of amorphous metallic matter. Yet another view is that the polishing process is "chemical" in nature and that specific chemical reactions take place between the polishing powder and the substrate usually by processes which involve the liquid medium. Rabinowicz, in the "Science Journal" (1970) Vol. 6, p 45, sees polishing as a process on the molecular scale, so "chemical" in that special sense, which is akin to dry burnishing.

Bowden, writing in 1953, emphasized the importance of another factor: the difference in the melting points of the polishing powder and of the metal substrate (Symposium on Properties of Metallic Surfaces, Institute of Metallurgy Monograph Ser. 13, p 335).

Since both processes, for "cut" and "color," are usually carried out simultaneously, the majority of commercial polishing compounds incorporate powder materials which provide for both functions. For instance, the cutting powder may be a relatively coarse "bunker alumina" (the final calcined product of the Bayer process) or a silicon carbide or corundum or quartz or other. The polishing component may be a product compositionally identical to that which is providing the cutting action except that it is very much finer in particle size. Alternatively, it may be a material specifically intended to contribute mainly the polishing action by means different to those which are held to polish by virtue of the production of microscratches.

It is normal commercial practice for both powder components to be combined together and mixed with a carrier which helps to retain the powder near the metal surface, or which lubricates the surface so preventing the appearance of grossly damaging major scratches, or which may act in some chemical manner on the metal, or which discourages the oxidation of the newly cleansed surface. To some extent all the carriers used commercially will show some if not all of these properties. Such carrier compounds include oils, fats, waxes, tallows, wool stearines, and oleic or stearic acids. In the case of polishing compounds which are largely based upon alumina, the proportion of powder to carrier will usually be about 70%/30% although, with other powders, the precise ratio will depend on the consistency required, the specific gravity of the powder, and its surface area. Formulations like these can then be further converted to an emulsion form wherein the powders and the carrier are dispersed in an aqueous solution.

DESCRIPTION OF THE INVENTION

The present invention provides a metal polishing composition comprising a boronated felspathoid and a carrier which is a solid, semi-solid or liquid material. The boronated felspathoid may be described as a synthetic alkali metal aluminosilicate having the crystal structure similar to that of the mineral, nosean, but containing a boron compound entrapped within that structure. Optionally, an abrasive powder may also be included in the composition.

The boronated felspathoid used according to the present invention can be made by any of the conventional processes for hydrothermal crystallization of zeolites, for example of sodalite hydrate, from a source of silica, a source of alumina, and a source of alkali metal, but with a source of boron such as boric acid or a sodium borate in the synthesis mixture. The source of silica and the source of alumina can be any kaolinite-type material in which the proportions of $Al_2O_3$ to $SiO_2$ are in the molecular ratio of about 1:2. Since any other minerals will remain largely unreacted in the process to be described it is advisable for the raw material chosen to be not less than 85% pure. The resultant felspathoid has a $B_2O_3$ content of about 2 to 10 percent by weight, preferably about 3 to 7 percent $B_2O_3$. A typical material has the following preferred composition:

| | |
|---|---|
| $Na_2O$ | 17–23% |

-continued

| | |
|---|---|
| $B_2O_3$ | 3–7% |
| $Al_2O_3$ | 26–35% |
| $SiO_2$ | 35–45% |

Two examples of the production of such a boronated felspathoid (or boronated zeolite) are described in U.S. Pat. No. 4,337,317 as follows:

EXAMPLE I

Sodium hydroxide (1712 g.) and 751 g. of borax decahydrate were dissolved in 4000 g. of distilled water in a stainless steel beaker. China clay (1085 g.) having a nominal particle size below 1 micron was added and the mixture was stirred for 24 hours at 85° C. (From observation, it appeared that the process of hydrothermal crystallization was complete after about 6 hours.) After filtering, washing with distilled water, and drying overnight at 130° C., 1175 g. of product were obtained. Its X-ray diffraction powder pattern was substantially identical to the mineral nosean suggesting the skeletal structure of the cage around the boron moiety. Chemical analysis showed that the product contained 20.5% $Na_2O$, 5.0% $B_2O_3$, 31.4% $Al_2O_3$, 39.8% $SiO_2$, the balance being water. The particle size was mostly less than 5 microns (estimated microscopically). 10 g. of this product was stirred with 100 g. distilled water for 6 hours at 25° C. but no more than one fiftieth of the $B_2O_3$ was leached out.

EXAMPLE II

A boronated felspathoid having the same properties as that produced by the method of Example I was made using sodium aluminate (113 g.) and sodium silicate (225 g.) as the source of alumina and silica (instead of china clay) with 154 g. sodium hydroxide, 96 g. borax and 1105 g. water.

The sodium aluminate was dissolved in half the total water, the other materials were dissolved in the remaining water. The solutions were combined at 40° C. and then stirred at 80° C. for one day. The product was filtered off and well washed until the pH of the washings is 10 and then oven dried at 110° C. It is good practice for the product to be screened while still in the wet state through a 300 (BS) mesh sieve to eliminate any oversize particles which could cause scratching.

A study of the effect of the choice of china clay, as in Example I, showed that there was very little difference in the chemical composition of the product. However the particle size distribution did vary somewhat as shown by the following results (Table I) wherein the product made with an electrical-procelain grade china clay was compared with that made from WTC clay (a commercial grade produced by English China Clays Ltd.) which contains a higher amount of mica:

TABLE I

| Test Method: Coulter Counter | | | |
|---|---|---|---|
| EP Grade | | WTC Grade | |
| less than (microns) | proportion (%) | less than (microns) | proportion (%) |
| 30 | 100.0 | 30 | 97.5 |
| 20 | 93.6 | 20 | 95.2 |
| 14 | 85.6 | 14 | 87.5 |
| 10 | 72.3 | 10 | 73.0 |
| 5 | 28.8 | 5 | 15.5 |

As a consequences of the intrinsic fineness of the material produced (over 70% is less than 10 microns) it will not normally be necessary to refine it further, such as by grinding or classifying, to render it suitable for the purposes of the invention.

The boronated felspathoid is combined with a suitable carrier in order to provide a liquid, solid or semi-solid polishing composition. Thus, the polishing composition may be a paste, cream, waxy solid or it may be deposited or impregnated on a solid substrate such as a woven or non-woven cloth or solid polymeric foam or sponge. Suitable carriers include water, organic acids such as oleic and stearic acids, soaps, and organic solvents such as alcohols, as well as woven and non-woven cloths and polyurethane foams and sponges.

The following examples serve to illustrate the present invention:

EXAMPLE III 10 g. of the boronated felspathoid are mixed with 10 g. of water to form a smooth, liquid paste.

EXAMPLE IV 10 g. of the boronated felspathoid are mixed with 10 g. of a commercial grade of oleic acid to form a smooth, liquid paste.

EXAMPLE V

The pastes made according to Examples III and IV are applied by hand using a minimum effort to various metal work pieces with a cloth and then finished by rubbing briskly with a clean cloth (after water rinsing in the case of the product from Example III). A comparison of the effect of the two Examples on various metal surfaces is given in Table II in which the numerical values have the following meaning:

| | |
|---|---|
| For "cut" | 0 = none |
| | 1 = perceptible |
| | 2 = marked |
| | 3 = very marked |
| | 4 = extensive |
| For "color" | 0 = none |
| | 1 = perceptible |
| | 2 = fair |
| | 3 = good (commercial quality) |
| | 4 = very good (commercial quality) |
| | 5 = excellent |

TABLE II

| | Example III | | Example IV | |
|---|---|---|---|---|
| Metal | Cut | Color | Cut | Color |
| Aluminum | 0 | 1 | 2 | 3 |
| Mild Steel | 1 | 1 | 1 | 1 |
| Stainless Steel | 1 | 4 | 2 | 4 |
| Copper | 0 | 1 | 2 | 3 |
| Brass | 0 | 1 | 2 | 3 |
| Silver | 1 | 4 | 2 | 5 |
| Pewter | 1 | 4 | 3 | 5 |
| Chrome | 2 | 5 | 2 | 5 |

It will be seen from Table II that the boronated felspathoid is most particularly effective as a polishing compound on silver, (modern) pewter (which is a most difficult material to polish satisfactorily) and chrome, giving results better than would be expected from a conventional commercial polish without the need for excessive effort. It will also be seen the effect is primarily that of "polishing" rather than "cutting."

The following example compared the effectiveness of the boronated compositions of this invention to a felspathoid without boron.

EXAMPLE VI

A sodalite hydrate was prepared according to Example II but the borax was omitted. The product was then treated as in Example IV and applied to a pewter workpiece. Its performance, estimated in the same way as described above, is:

| Metal | Example VI (Without Borax) | | Example II (With Borax) | |
|---|---|---|---|---|
| | Cut | Color | Cut | Color |
| Pewter | 2 | 2 | 3 | 5 |

EXAMPLE VII

Boronated felspathoid (3 g.) and 7 g. of china clay are mixed with 10 g. of a commercial oleic acid to form a smooth paste. The compound so prepared is applied by hand to a (modern) pewter workpiece until the compound turns black—usually taken as an indication that some removal of surface metal is taking place. Upon rubbing with a clean dry cloth the metal assumes a bright, silvery sheen.

The following examples show how the boronated felspathoid can be combined with conventional carriers.

EXAMPLE VIII 45 parts by weight of stearic acid are heated to 70° C. to ensure thorough melting and 55 parts by weight of the boronated felspathoid are slowly added with stirring. On completion the mass is poured into moulds and the "bar" or "buffing stick" recovered on cooling. This product is suitable for use in routine industrial polishing processes such as in conjunction with a buffing wheel.

EXAMPLE IX

A soap is prepared by neutralizing stearic acid in very hot water with triethanolamine in such a manner that the final composition contains about 60% water by weight. To a warm mixture containing 5 parts by weight of the soap and 60 parts of water is added 35 parts by weight of the boronated felspathoid. A stable, smooth paste is formed which should be packed before complete cooling. This paste can be used in hand operations or in conjunction with a buffing wheel.

Compositions of the types illustrated by Examples VIII and IX may also incorporate standard abrasive powders. For instance:

EXAMPLE X 50 parts by weight of stearic acid are heated to 70° C. and 25 parts by weight of aluminum oxide Grade P11 or P66 (Guilini) are added and the mixture gently stirred. Thereafter 25 parts by weight of the boronated felspathoid are slowly added with stirring. The mass is the poured into moulds and the "buffing stick" recovered on cooling. This product would be particularly suitable for use in industrial processes for polishing stainless steel.

EXAMPLE XI 45 parts by weight of stearic acid are heated to 70° C. and 5 to 10 parts by weight of aluminum oxide Grade P12 (Guilini) are added with stirring. Thereafter 50 to 45 parts of boronated felspathoid are also added. The mass is then poured into suitable moulds. The "buffing sticks" so made will be suitable in industrial processes for polishing chrome plate.

"Cream" compositions which would be suitable for domestic use are shown in the following Examples.

EXAMPLE XII

The ingredients are added in the amounts and in the order shown:

| Boronated felspathoid | 1452 grams |
|---|---|
| Borax | 55 grams |
| Lithium magnesium zeolite type gelling agent | 30 grams |
| Water | 1784 grams |
| Oleic acid | 132 grams |
| Non-ionic wetting and dispersing agent | 132 grams |
| Perfume concentrate | 15 grams |
| | 3600 grams |

The product is a thick, creamy fluid with a slow but regular and smooth flow. In the form described it will be found particularly suitable for polishing silver or silver plate.

EXAMPLE XIII

| Boronated felspathoid | 36% |
|---|---|
| Lithium magnesium zeolite type gelling agent | 1% |
| Oleic acid | 1% |
| Non-ionic surfactant | 1% |
| Boric acid | 1.5% |
| Borax | 1.5% |
| Perfume | 0.5% |
| Water | balance to 100% |

Polish compositions intended for domestic use should preferably incorporate a tarnish ingredient, such as the known fluorochemical resins.

As pointed out above, the boronated felspathoid is a very efficient polishing agent for many metals. However, it should be noted that the carrier medium must be designed not only with the consideration of the convenience of application, long term viscosity, stability, etc., but also with due regard to the fact that the overall effect on some metals will be favored at the expense of the effect on others. For instance, although the composition of Example XII is excellent on silver, it is not particularly good on chrome. This balance can be altered in favor of a good chrome finish by increasing the proportion of oleic acid relative to the water and borax; but insofar as this is done the very high efficiency on silver will be lost. The demands made by other metals will be different. This can be shown most easily in the case of copper or brass with which, traditionally, a medium containing ammonia combined with a solvent is used.

EXAMPLE XIV

The boronated felspathoid (10 g.) is mixed with 5 g. of a 40% (in water) solution of cetyltrimethylammonium bromide, 2 g. of a 30% (in water) solution of the sodium salt of ethylenediamine tetra-acetic acid and 3 g. of water. The paste was applied by hand to copper and brass with minimum effort and then finished by rubbing briskly with a clean cloth. The results are shown in the following table:

|  | Cut | Color |
|---|---|---|
| Copper | 4 | 4 |
| Brass | 4 | 4 |

Various changes and modifications of the invention can be made, and, to the extent that such variations incorporate the spirit of this invention, they are intended to be included within the scope of the appended claims.

What is claimed is:

1. A metal polishing composition comprising a boronated felspathoid and a carrier therefor.

2. A metal polishing composition according to claim 1 in which said carrier is water in an amount to form a fluid paste.

3. A metal polishing composition according to claim 1 in which said carrier is oleic acid in an amount to form a fluid paste.

4. A metal polishing composition according to claim 1 in which said carrier is stearic acid.

5. A metal polishing composition according to claim 1 in which an abrasive powder is included.

6. A metal polishing composition according to claim 1 in which said carrier is a cloth or foam sheet.

7. A metal polishing composition according to claim 1 in which said carrier is creamy fluid containing oleic acid and water.

8. In the method of polishing metal surfaces, the improvement which comprises the use of a boronated felspathoid as the polishing media said boronated felspathoid is a synthetic alkali metal aluminosilicate containing about 2 to 10 percent $B_2O_3$.

9. The method according to claim 8 in which said boronated felspathoid is combined with a solid, liquid or semi-solid carrier.

10. The method according to claim 9 in which an abrasive powder is combined with said boronated felspathoid and said carrier.

11. The method according to claim 8 in which said felspathoid is a synthetic sodium aluminosilicate.

12. The method according to claim 9 in which the carrier is a soap solution.

13. The method according to claim 9 in which the carrier includes oleic acid.

14. The method according to claim 9 in which the carrier is a woven or non-woven cloth.

15. The method according to claim 9 in which the carrier includes stearic acid.

16. The method according to claim 9 in which said carrier is a paste.

17. The method according to claim 8 in which said boronated felspathoid contains about 2 to 10% $B_2O_3$.

18. The method according to claim 8 in which said boronated felspathoid is a synthetic sodium aluminosilicate of the composition

| $Na_2O$ | 17–23% |
|---|---|
| $B_2O_3$ | 3–7% |
| $Al_2O_3$ | 26–35% |
| $SiO_2$ | 35–45% |

19. The composition according to claim 1 in which said boronated flespathoid is a synthetic sodium aluminosilicate of the composition

| $Na_2O$ | 17–23% |
|---|---|
| $B_2O_3$ | 3–7% |
| $Al_2O_3$ | 26–35% |
| $SiO_2$ | 35–45% |

* * * * *

UNITED STATES PATENT OFFICE
CERTIFICATE OF CORRECTION

Patent No. 4,491,478      Dated   Jan. 1, 1985

Inventor(s)  John P. H. Williamson

It is certified that error appears in the above-identified patent and that said Letters Patent are hereby corrected as shown below:

Column 7, line 16, after "therefor" -- said boronated felspathoid is a synthetic alkali metal aluminosilicate containing about 2 to 10 percent $B_2O_3$. -- .

Signed and Sealed this

Fifteenth Day of October 1985

[SEAL]

Attest:

Attesting Officer

DONALD J. QUIGG

Commissioner of Patents and Trademarks—Designate